3,577,467
PROCESS FOR THE HYDROLYSIS OF LIGNIN
Irving S. Goldstein, Downers Grove, and Joseph D. Benigni, Chicago, Ill., assignors to Continental Can Company, Inc., New York, N.Y.
No Drawing. Filed May 29, 1968, Ser. No. 732,836
Int. Cl. C07c 37/28
U.S. Cl. 260—627                                      5 Claims

ABSTRACT OF THE DISCLOSURE

High yields of low molecular weight phenolic substances are obtained by heating, at 250° to 380° C. for 3 to 45 minutes, a slurry of water and a lignin material separated from the liquor resulting from the alkaline pulping of lignocellulose, and then recovering the phenolic materials from the reaction mixture.

BACKGROUND OF THE INVENTION

(1) Field of the invention

This invention relates to a process of hydrolyzing a lignin material to produce valuable and useful chemical substances therefrom, and more particularly, this invention relates to an improved process for hydrolyzing a lignin material to produce low molecular weight phenolic substances useful in the manufacture of organic chemicals.

(2) The prior art

Various methods for the hydrolysis of lignin materials have been proposed. Such methods include alkali heating of lignin and spent liquors with varying additions of alkaline reagents at elevated temperatures and pressures.

For example, U.S. Pat. No. 2,405,450 described a process wherein catechol and monohydric phenols are obtained by heating lignin in a pressure vessel at a temperature of 270° to 350° C. in the presence of a mixture of water, alkali metal hydroxides and carbonates, and a partially water-immiscible lower primary aliphatic alcohol.

Enkvist (Tappi, vol. 45, No. 2, February 1962, pages 128 to 135) teaches guaiacol, catechol and their alkyl derivatives are the principal products obtained when kraft black liquors are heated at 250° to 300° C. and at pressures of 60 to 300 atmospheres in the presence of sodium hydroxide or sodium sulfide.

Clark and Green (Tappi, vol. 51, No. 1, January 1968, pages 44 to 48) disclose that guaiacol, catechol and their alky derivatives are obtained by heating Kraft lignin at 300° C. in a closed vessel in the presence of 4% NaOH for 30 minutes.

The use of alkaline solutions in the hydrolysis reaction of lignin to produce low molecular weight phenolic substances presents certain commercial disadvantages, such as the cost of the alkaline reagent and the need to neutralize the reaction medium in order to extract the phenolic reaction products from the reaction medium. The presence of an alkaline solution renders the low molecular weight hydrolysis products susceptible to recondensation to high molecular weight materials which are unsuitable for commercial use. The use of alkali reagents, such as NaOH at high temperatures in metallic reaction chambers has a further economic disadvantage in the corrosive action of the alkali on the metal at high temperatures.

The present invention provides a process by which valuable low molecular weight phenolic substances can be produced economically on a commercial scale by the hydrolysis of lignin.

SUMMARY OF THE INVENTION

In accordance with the present invention, low molecular weight phenolic substances are obtained from a lignin material economically on a commercial scale by heating a slurry of a lignin material separated from the liquor resulting from the alkaline pulping of lignocellulose and water in a closed vessel at temperatures in the range of about 250° C. to about 380° C. for about 3 to about 45 minutes, the reaction period being inverse to the temperature and then recovering the low molecular weight phenolic substances from the reaction mixture.

The practice of the present invention provides high yields of low molecular weight phenolic substances and eliminates the presence of an alkaline reagent in the reaction mixture and the concomitant commercial disadvantages.

PREFERRED EMBODIMENTS

Lignin materials which may be hydrolyzed in accordance with the present invention may be derived from any available source of lignocellulose, e.g., wood, bagasse, straw, corn cobs, and the like.

It is a critical and essential feature of the present invention that the lignin material used in the process of the present invention be a lignin material obtained by the alkaline pulping of lignocellulose. As will hereinafter be illustrated, the hydrolysis of lignin materials derived from pulping processes other than alkaline pulping in accordance with the present invention results in very low yields of low molecular weight phenolic materials which is commercially unattractive.

Lignin separated from the black liquor resulting from the digestion and pulping of coniferous wood in the sulfate process, referred to in the art as Kraft liquor lignin (thiolignin) is preferred in the process of the present invention.

In carrying out the process of the present invention, a lignin slurry is prepared by adding the lignin to water with good agitation to obtain a uniform slurry and then charging the slurry into an autoclave or other suitable pressure vessel to form a reaction mixture comprising about 1% to about 50% lignin and about 50% to about 99% water. A slurry containing about 30% to about 50% lignin and about 50% to about 70% water is preferred. Advantageously, the slurry should not contain more than 50% lignin because of the extremely high viscosity of slurries containing more than 50% solids.

The lignin-water slurry is then subjected to an elevated temperature for a time sufficient to attain substantial hydrolysis of the lignin material. When the hydrolysis reaction has proceeded to high yield, the reaction mixture is removed from the reaction zone and the unreacted solid lignin is separated from the liquid portions of the reaction mixture, and the low molecular weight phenolic materials are recovered from these separate portions.

One method of recovery is by extraction from the solid unreacted lignin and the liquid portions of the reaction product with a suitable water immiscible organic solvent, such as ethyl acetate, butanol, chloroform and the like to yield a solution containing low molecular weight phenolic substances which can readily be fractionated from other components of the solution.

By following the practice of the present invention, yields of low molecular weight phenolic substances in the range of 8% to 45% are obtained. Low molecular weight phenolic substances which are obtained by the process of the present invention include mononuclear aromatic materials, such as catechol and guaiacol, as well as aromatic hydroxy dimers and trimers. These compounds are useful as photographic chemicals, antioxidants for plastic and asphaltic materials, and for producing synthetic resins, such as by reaction of the low molecular weight phenolic hydrolysis products with formaldehyde.

The hydrolysis reaction, in accordance with the present invention, is carried out at temperatures ranging from about 250° to about 380° C. This temperature range is an important feature of the present invention. If temperatures substantially below 250° C. are used, the time required for yields of the low molecular weight phenolic substances in commercial amounts is too long to justify commercial application of the process. If temperatures substantially in excess of 380° C. are employed, reduced yields of phenolic materials are obtained due to degradation of the reaction product.

The time of reaction used in the process of the present invention depends upon the reaction temperatures employed for the hydrolysis. The time of reaction is inverse to the temperature. At the higher temperatures of the range, shorter reaction times are used, e.g., at 350° C., a reaction time of 5 to 10 minutes is used. At the low temperatures of the range, longer reaction times are used, e.g., at 275° C., a reaction time of 20 to 25 minutes is used. Generally, for reaction temperatures in the range of about 250° C. to about 380° C., the reaction times required to obtain commercial yields of low molecular weight phenolic materials are in the range of about 45 to about 3 minutes. The preferred and most advantageous operating conditions from a consideration of maximum yield of low molecular weight phenolic compounds and economical use of process equipment are to hydrolyze the lignin-water slurry at a temperature of 300° to 350° C. for reaction times of 5 to 10 minutes.

The hydrolysis reaction following the practice of the present invention may be performed by batch technique or continuously. In a continuous procedure, the lignin-water slurry is forced continuously through a reaction chamber in such a way that the products of the hydrolysis reaction that are formed are cooled off immediately after they leave the reaction chamber and are collected in an extraction unit in which the low molecular weight phenolic compounds are extracted from the hydrolysis reaction products with a water immiscible organic solvent. In comparison with the prior art procedures, the present continuous process has the material economic advantage that the reaction products do not have to undergo neutralization prior to the extraction step to obtain the low molecular weight phenolic compounds.

Surprisingly enough, as will hereinafter be illustrated in the example below, even after a comparatively short time in the reaction zone, the hydrolysis of the lignin in the process of the present invention is very extensive, and from the total lignin subjected to hydrolysis, industrially useful low molecular weight phenolic compounds in high yield are obtained.

The following example illustrates the process of the present invention, but is not intended to limit it in any way.

EXAMPLE

Thiolignin obtained by precipitation through neutralization of a Kraft pulp waste liquor with sulfuric acid, was hydrolyzed in a series of runs identified and further described in Table I below. The hydrolysis runs were carried out in a stainless steel reactor tube having an inner diameter of 12.5 mm. and a volume of 40 milliliters. To the reactor tube was charged 5 ml. of water and 5 grams of thiolignin. The sealed reactor tube containing the mixture of lignin and water was placed in a fluidized sand bath and heated for varying times and at varying temperatures. The liquid and solid portions of the resultant reaction product were extracted with chloroform, which dissolved a chloroform soluble fraction.

The heating times, temperatures and yields of chloroform soluble substances under these reaction conditions are summarized in Table I below.

The chloroform soluble fractions were analyzed qualitatively by precipitation with lead acetate and partly quantitatively by vapor phase chromatography. The lead acetate precipitation is a qualitative test indicating the presence of 1,2-dihydroxybenzene groupings. A typical analysis of the chloroform soluble fraction indicated that the chloroform extracted fraction contains 1.72 percent guaiacol, 0.25 percent methyl guaiacol, 0.27 percent ethyl guaiacol, 0.20 percent catechol, the remainder consisting primarily of compounds having 1,2-dihydroxybenzene groupings having a combining weight of approximately 350 representing phenolic dimers and trimers. The above percentages are based on the lignin charged to the reactor.

TABLE I

| Run No.: | Time (minutes) | Temperature, °C. | Yield of $CHCl_3$ soluble compounds, percent [1] |
|---|---|---|---|
| 1 | 3 | 380 | 25 |
| 2 | 4.5 | 360 | 45 |
| 3 | 7.5 | 350 | 36 |
| 4 | 7.5 | 300 | 18 |
| 5 | 11 | 345 | 33 |
| 6 | 15 | 385 | 10 |
| 7 | 15 | 350 | 23 |
| 8 | 15 | 330 | 26 |
| 9 | 15 | 300 | 30 |
| 10 | 15 | 275 | 8 |
| 11 | 21 | 275 | 15 |
| 12 | 25 | 300 | 31 |
| 13 | 30 | 275 | 22 |
| 14 | 45 | 250 | 34 |

[1] Based on lignin charged to reactor.

By way of contrast, the procedure of the example was repeated with the exception that lignin obtained from sources other than from the alkaline pulping of lignocellulose was hydrolyzed. The results of these runs are recorded in Table II below.

TABLE II

| Run Number | Time, minutes | Temperature, °C. | Source of lignin | Yield of $CHCl_3$ Soluble compounds, percent [1] |
|---|---|---|---|---|
| $C_1$ | 15 | 300 | Acid hydrolysis | 0 |
| $C_2$ | 15 | 300 | Acid sulfite | 5 |
| $C_3$ | 15 | 300 | Na lignosulfonate | 4 |

[1] Based on lignin charged to reactor.

By comparing the data in Table I and Table II, it is at once apparent that by hydrolyzing lignin derived from the liquor resulting from alkaline pulping of lignocellulose in accordance with the present invention (Table I), substantially higher yields of low molecular weight phenolic materials are obtained when contrasted with the yields of phenolic substances using lignin obtained from sources other than from the alkaline pulping of lignocellulose (Table II).

What is claimed is:

1. A process for making low molecular weight phenolic substances from lignin materials comprising the sequential steps of:
   (a) charging a slurry consisting essentially of a lignin material separated from the alkaline pulping of lignocellulose and water into a closed reaction zone;
   (b) heating the slurry at a temperature between about 250° to about 380° C., the slurry remaining in the reaction zone for a reaction period of about 3 to about 45 minutes, the reaction period being inverse to the temperature;
   (c) removing the heated slurry from the reaction zone and extracting the phenolic substance with a water immiscible organic solvent from the solid unreacted lignin and the liquid portions of the slurry; and then
   (d) fractionating the extract to obtain the low molecular weight phenolic substances.

2. The process of claim 1 wherein the lignin is thiolignin.

3. The process of claim 1 wherein the mixture charged to pressure vessel contains about 1% to about 50% lignin and about 50% to about 99% water.

4. The process of claim 1 wherein the slurry is heated at a temperature of from 300° to 350° C. for 5 to 10 minutes.

5. The process of claim 1 wherein the slurry contains about 30 to about 50 percent by weight lignin and about 50 to about 70 percent by weight water.

References Cited

UNITED STATES PATENTS

| | | | |
|---|---|---|---|
| 2,405,450 | 8/1946 | Salvesen et al. | 260—627H |
| 2,901,389 | 8/1959 | Hossain | 162—73 |

FOREIGN PATENTS

| | | | |
|---|---|---|---|
| 736,360 | 9/1955 | Great Britain | 260—627H |

HOWARD T. MARS, Primary Examiner

W. B. LONE, Assistant Examiner